L. L. GRIFFITHS.
BELT FASTENING.
APPLICATION FILED APR. 28, 1908.
987,716.
Patented Mar. 28, 1911.
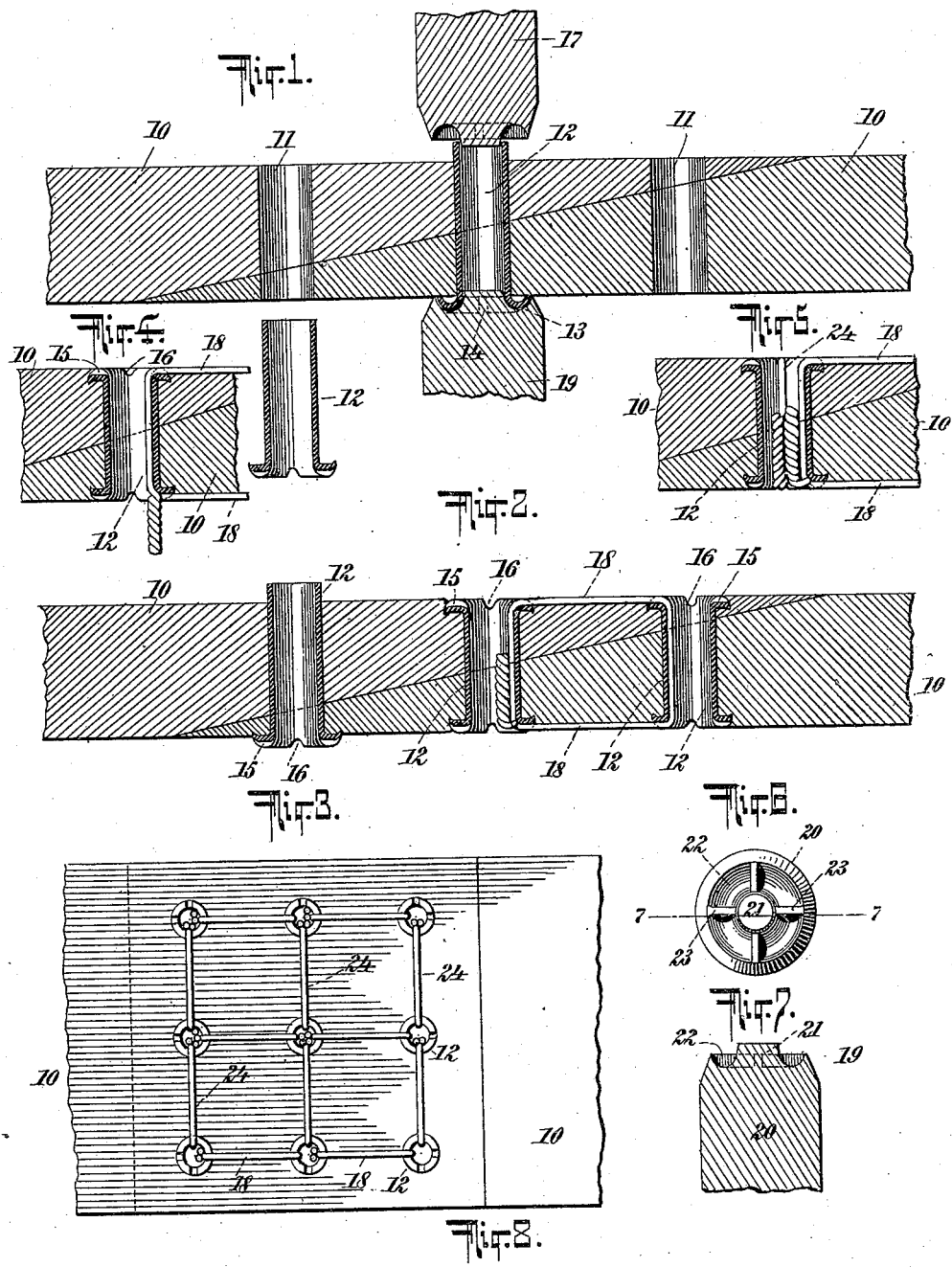
WITNESSES:
INVENTOR
Leonard L. Griffiths
BY
Conrad A. Dutrich
his ATTORNEY

UNITED STATES PATENT OFFICE.

LEONARD L. GRIFFITHS, OF BEDFORD, INDIANA.

BELT-FASTENING.

987,716.

Specification of Letters Patent. Patented Mar. 28, 1911.

Application filed April 28, 1908. Serial No. 429,677.

*To all whom it may concern:*

Be it known that I, LEONARD L. GRIFFITHS, a citizen of the United States, residing at Bedford, Lawrence county, in the State of Indiana, have invented certain new and useful Improvements in Belt-Fastenings, of which the following is a full, clear, and exact specification.

My invention relates to means for securing together the ends of belts, or the adjoining sections of belts to make a continuous structure, and my said invention has for its object more particularly to provide a means whereby the belt ends, or the ends of the belt sections may be secured together in such a manner that the strain will be taken from each individual fastening device and distributed over the entire series of fastening devices.

Further, said invention has for its object to provide a fastening means in which the individual fastening devices are arranged in rows and the individual fasteners of each row secured to the fasteners of the adjoining row or rows by means of flexible connections.

To the attainment of the aforesaid objects and ends my invention consists in the novel details of construction, and in the combination, connection and arrangement of parts hereinafter more fully described and then pointed out in the claim.

In the accompanying drawings forming part of this specification, wherein like numerals of reference indicate like parts. Figure 1 is a longitudinal section showing two beveled overlapping ends of a belt provided with apertures and a fastening device in one of said apertures in position to be clamped therein; Fig. 2 is a similar view showing a plurality of fastening devices, two thereof being clamped in position therein, and a flexible member connecting said two fastening devices; Fig. 3 is a detail plan view on a reduced scale showing the overlapping ends of a belt with the fastening devices in position therein and secured together by means of flexible connections; Fig. 4 is a detail sectional view showing one fastening device clamped in position in two overlapping ends of a belt section, and flexible connections extending therethrough showing the ends of said connection united and projecting below said fastening device; Fig. 5 is a similar view showing the connected ends of two flexible fastenings twisted together and tucked away within the fastening device; Fig. 6 is a detail face view showing a form of die for riveting the fastening device in position within the belt; Fig. 7 is a section thereof taken on the line 7—7 of Fig. 6, and Fig. 8 is an enlarged detail face view showing a fastening device and the radial grooves in the flanges thereof.

In said drawings 10, 10 denote a belt having its ends beveled or scarfed and said ends overlapped and provided with a plurality of circular apertures 11.

12, 12 denote tubular eyelets provided at their lower portions with lateral flanges 13, 13 having a plurality of radial recesses 14, 14 therein. The opposing ends of the belt 10, 10 are secured together by means of the eyelets 12, 12 which are disposed within the recesses 11, 11 therein from below, and their upper ends then bent over to form lateral flanges 15, 15 provided with radial recesses 16 by means of corresponding dies 17, 19, as shown at Fig. 1. As soon as all the tubular eyelets 12, 12 have been secured within the apertures 11, 11 the same are connected together by means of wires 18, 18 which have their ends adjacent to the lower ends of the tubular eyelets brought together and twisted, and said twisted ends then tucked away within the body of the tubular eyelets as illustrated at Fig. 5. The wires 18, 18 form flexible links which extend through adjoining eyelets, and are disposed in the radial recesses 14, 16 in the flanges 13, 15 of said eyelets. The tubular eyelets 12 12 are clamped to the belt by means of dies 17 19 comprising the shanks 20 20 having recessed ends each provided with a centrally disposed boss 21, and an annular recess 22 surrounding said boss, within which are disposed radial ribs 23 23 serving to produce the lateral flanges 13 and 15 of the tubular eyelets, and the radial recesses 14, 16 in said lateral flanges 13, 15 respectively.

In the construction illustrated at Fig. 3 I have shown the tubular eyelets 12, 12 arranged in three rows, each composed of three eyelets, and the eyelets of each longitudinal row connected together by flexible link members 18, 18, and each transverse row of eyelets connected by flexible link members 24, 24. By this arrangement the strain upon each individual eyelet is relieved and the same distributed over the entire series or number of eyelets, thus producing a belt fastening which is not only durable but flexible, and in which the strain is distributed over the entire fastening device.

It will, of course, be obvious that instead of arranging the tubular eyelets or fastening devices in the form shown at Fig. 3, the same may be arranged in different combinations, or as desired to meet particular circumstances, it merely being necessary in some instances to change the position and number of the radial recesses in the flanges of the eyelet members in order to receive the flexible connections whereby the fastening devices are united.

Having thus described my invention, what I claim and desire to secure by Letters Patent is:

A belt fastening comprising a plurality of tubular fastening members provided at their opposite ends with flanges adapted to clamp adjoining belt ends there-between, and said flanges provided with radial recesses, and flexible links extending through said tubular members, and located in the recesses in said flanges for connecting said fastening members together, substantially as specified.

Signed at Bedford, in the county of Lawrence and State of Indiana, this twenty-third day of April, nineteen hundred and eight.

LEONARD L. GRIFFITHS.

Witnesses:
G. C. BOSLEY,
C. HOVEY.

---

Copies of this patent may be obtained for five cents each, by addressing the "Commissioner of Patents, Washington, D. C."